Jan. 13, 1931.     J. A. RICE     1,788,592
METHOD OF MANUFACTURING ARTIFICIAL TRAVERTINE OR THE LIKE
Filed Oct. 26, 1926
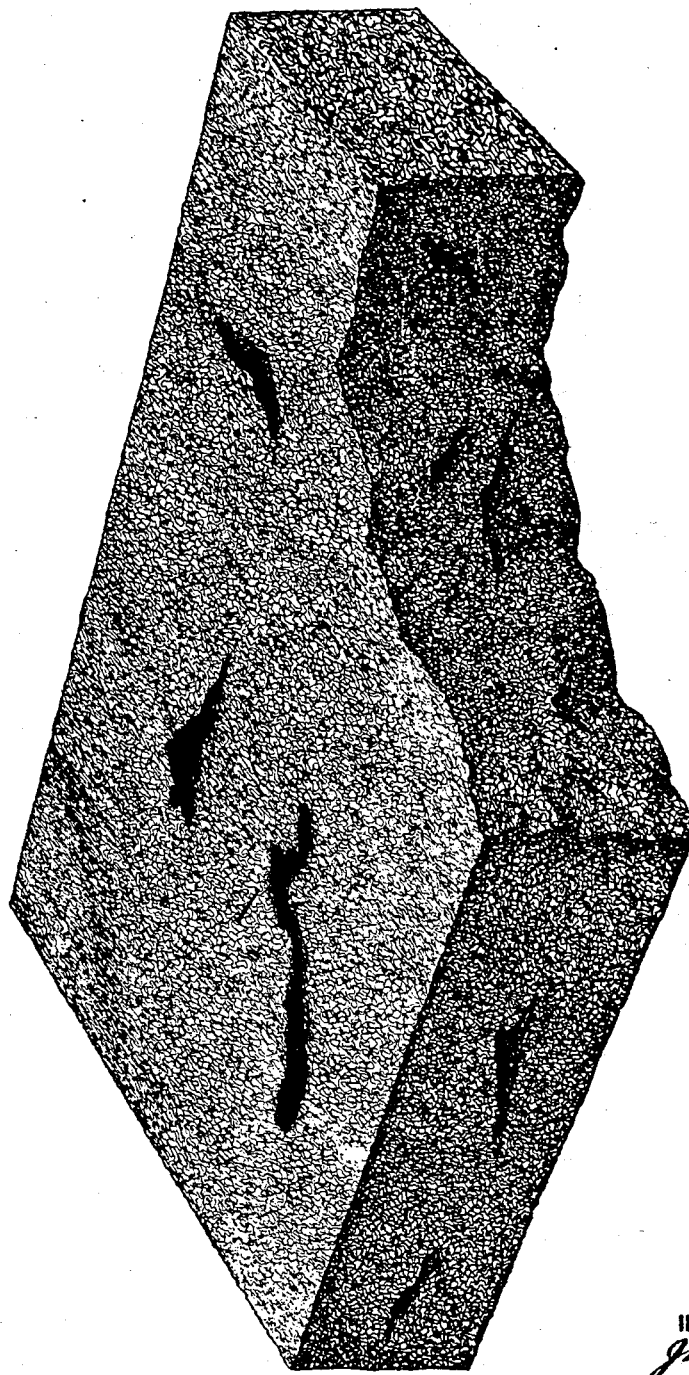

Patented Jan. 13, 1931

1,788,592

UNITED STATES PATENT OFFICE

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA

METHOD OF MANUFACTURING ARTIFICIAL TRAVERTINE OR THE LIKE

Application filed October 26, 1926. Serial No. 144,395.

The present invention relates to the manufacture of artificial stone or travertine in which there usually occurs, in the natural state, various irregularly shaped spaces or voids, and generally the invention consists in artifically forming voids in a cementitious mass of plastic cement material whereby the artificial product resembles the natural stone or travertine.

According to my process irregularly shaped bunches or masses of thick lathery foam, prepared as hereinafter set forth, are scattered throughout a body of cementitious plastic material, the foam constituting or creating the voids in the finished article which may be thus made to closely resemble the voids or cavities of natural travertine and other kinds of natural stone. In the attached drawing the figure shows a perspective view of the artificial stone.

Although the invention is not limited to the use of any specific materials in the production of the foam, I have found that a mixture of casein, water, rosin, and sufficient ammonia to saponify the casein and rosin is quite suitable for this purpose. Good results have been obtained by employing a mixture of one-hundred (100) parts by weight of casein, seven hundred (700) parts by weight of water, twenty-five (25) parts by weight of pure rosin, powdered and mixed with water in the proportion of one (1) part rosin to eighteen (18) parts water, one (1) ounce ammonia per pound of casein, and two (2) ounces ammonia per pound of rosin. These amounts of ammonia have been found sufficient to effect the required saponification of the casein and rosin. This mixture is preferably diluted with water to the extent of one (1) part mixture to eighty (80) parts water and the diluted solution beaten to a stiff foam and used in the manner as hereinafter set forth. If desired a small portion of calcium chloride may be added to the foam and stirred therewith, the purpose thereof being to harden and stiffen the finished foam, rendering it especially suitable for the process of incorporation in the mold as set forth below. Other hardening and stiffening agents may be employed.

To prepare the artificial stone according to my invention, a suitable cementitious plastic material is provided and an appreciable portion thereof is spread over the bottom of a mold or container for casting the stone. The material may be of various colors and placed very irregularly, if desired. Following the introduction of the plastic material, irregular masses or portions of thick foam prepared as above described are placed in the mold. These bodies of foam may be directed to their proper places by means of a screen through which they are forced, or any other mechanical contrivance may be used which will produce the irregularly shaped masses of foam. Following the introduction of the foam, additional plastic material is added, and then more irregularly shaped bunches of foam. The plastic material and foam being alternately added in such manner that when the mold is finally filled there will be irregularly shaped masses of foam scattered throughout the body of plastic material. The foam may be distributed throughout the cementitious material in any manner desired, as for example, by mixing or the like or the cementitious plastic material and the foam may be spread in alternate layers in a mold as above described.

The cement is now allowed to harden and when sliced by any suitable means, the exposed surfaces of the blocks, where cut, will contain irregularly shaped voids closely resembling the voids of natural travertine and other kinds of natural stone. By the above described process, irregularly shaped voids, as well as regularly shaped cellular voids, may be included in cast stone.

The proportions of materials described above should, of course, be in the same ratio as the voids and stone in the rock which is being imitated, the foam constituting the voids.

While still in a fresh unset condition, the product may be sliced as described in my copending U. S. patent application Serial No. 144,396, filed October 26, 1926 thus forming convenient slabs for subsequent polishing by means of carborundum stones or by other methods employed in the art.

The specific details herein set forth are not to be construed as limiting the invention, the scope of which is governed only by the appended claims.

What is claimed as new is:

1. The process of manufacturing artificial stone which comprises beating a mixture of casein and rosin to form a stiff foam, distributing said foam through a cementitious material, and allowing the material to harden.

2. A process as defined in claim 1 in which the casein and rosin are saponified.

3. The process of preparing artificial stone which comprises scattering through a cementitious plastic material a thick foamy substance adapted to form voids and containing water, casein, rosin, and calcium chloride and allowing the cementitious material to harden.

4. A process of manufacturing artificial stone which includes preparing a foam from an aqueous mixture of saponified casein and saponified rosin, distributing said foam through a cementitious material and allowing the material to harden.

5. A process as defined in claim 4 in which there is added to the foam a substance adapted to harden the same.

6. A process as defined in claim 4 in which calcium chloride is added to the foam.

7. A process of preparing artificial stone which comprises beating into a stiff foam an aqueous mixture of casein and rosin containing sufficient ammonia to saponify the casein and rosin, introducing said foam into a cementitious plastic material, and allowing the material to harden.

8. A process as defined in claim 7 in which calcium chloride is added to the foam.

In testimony whereof I affix my signature.

JOHN A. RICE.